United States Patent [19]

Gale

[11] 4,330,215

[45] May 18, 1982

[54] MIXING DEVICE

[75] Inventor: George M. Gale, Shrewsbury, England

[73] Assignee: Rubber & Plastics Research Assoc of GB, England

[21] Appl. No.: 145,826

[22] Filed: May 1, 1980

[30] Foreign Application Priority Data

May 3, 1979 [GB] United Kingdom ............... 7915508

[51] Int. Cl.³ ........................ B29B 1/06; B01F 7/02
[52] U.S. Cl. ................................. 366/99; 366/292; 366/303; 366/331; 241/259.2; 241/261
[58] Field of Search .............. 366/303, 304, 331, 176, 366/287, 288, 292, 295, 299, 97, 98, 99; 241/259.2, 261

[56] References Cited

U.S. PATENT DOCUMENTS

| Re. 23,772 | 1/1954 | Spencer | 366/303 X |
|---|---|---|---|
| 1,897,157 | 2/1933 | Wells | 366/176 X |
| 2,115,123 | 4/1938 | Russell | 366/303 X |
| 2,764,781 | 10/1956 | Kelly | 366/99 |
| 3,592,609 | 7/1971 | Honbo | 366/303 X |

FOREIGN PATENT DOCUMENTS 229176 7/1960 Australia ................... 366/99

Primary Examiner—Philip R. Coe
Attorney, Agent, or Firm—Fred Philpitt

[57] ABSTRACT

A mixing device having a flow path therethrough for material to be mixed includes a first plurality of radially extending, tapered rollers disposed between a first pair of relatively rotating raceways for subjecting the material to a milling action, a plurality of sets of alternately encountered stationary and moving teeth disposed in adjacent parallel planes for subjecting the material to a shearing action, and a second plurality of radially extending, tapered rollers disposed between a second pair of relatively rotating raceways for subjecting the material to a further milling action. The arrangement is such that a predetermined axial spacing between adjacent sets of the teeth is continuously maintained by means of the rollers and raceways.

4 Claims, 4 Drawing Figures

MIXING DEVICE

The present invention relates to mixing devices.

There has been a trend in recent years for converters of polymer into products by extrusion, blow moulding and injection moulding to use natural polymer and colour concentrates instead of pigmented compounds. Reliance is placed on the converting machinery to incorporate pigments added in the form of either dry colours, liquid colour pastes or masterbatches. This has economic advantages to both polymer products and converters.

For the polymer producer, it is more profitable and makes better use of resources to sell natural polymer than to make and sell compound. For the converter there is an immediate material price advantage as well as economies from reduced material stocks and a wider choice of suppliers.

In many cases "in-plant" colouring is successful, but with the incorporation of the more difficultly dispersible pigments, such as carbon black, into products meeting predetermined technical requirements, such as in the case of cables and water pipes, difficulties are encountered in obtaining a sufficiently uniform carbon black distribution.

Most standards require the inclusion of 2 to 3% carbon black into polyethylene products exposed to natural weathering to impart sufficient resistance to UV light. The necessity to break down carbon black agglomerates and obtain good dispersion in order to achieve good UV protection has been demonstrated. In the preparation of masterbatches containing 30 to 40% carbon black in polyethylene, a high viscosity mix is produced which generates the shearing forces necessary to break down the carbon black agglomerates. By tumbling or meter feeding the 40% carbon black masterbatch at a 5% level with natural polymer, an extrudate with the required 2% carbon black is obtained. Unfortunately, however, the distribution of the masterbatch after a single pass through a conventional single screw extruder is inadequate for most applications requiring UV resistance. The result is normally that the masterbatch exists as very thin laminar streaks separated by layers of unpigmented natural material.

In an attempt to overcome these shortcomings, some extruders are fitted with special mixing devices which can be grouped in three categories, namely (1) static mixers, (2) barrier mixing systems, and (3) mixers having rolling or intermeshing elements. Although mixers of types (1) and (2) are suitable for some colouring materials, their mixing action is insufficient for many practical purposes, such as the carbon black dispersion required by the relevant British Standards for water pipes (BS 1972:1967) and certain electrical cables (BS 6234:1969).

By using roller bearings as described in our prior UK Pat. No. 1,345,531, dispersion meeting BS 1976 can be obtained but this is generally restricted to the use of high viscosity polyolefines such as polypropylene. By using intermeshing teeth as described in UK 787764, pipes meeting BS 1972 can be extruded using masterbatch. However, operating difficulties are experienced due to the differential axial movement of the intermeshing teeth, for example due to thermal expansion, as a result of which the teeth can become engaged and eventually become damaged.

It is an objective of the present invention to provide a mixing device utilising intermeshing teeth which does not suffer from the aforegoing problem and which has improved mixing properties compared with the aforementioned known devices.

In accordance with one aspect of the present invention, there is provided a mixing device having a flow path therethrough for material to be mixed which includes, in the following order, a first plurality of rollers disposed between a first pair of relatively rotating raceways for subjecting said material to a milling action, a plurality of sets of alternately encountered stationary and moving teeth disposed in adjacent parallel planes for subjecting said material to a shearing action, and a second plurality of rollers disposed between a second pair of relatively rotating raceways for subjecting said material to a further milling action, the arrangement being such that a predetermined axial spacing between adjacent sets of said teeth is continuously maintained by means of said rollers and raceways.

In accordance with a second aspect of the present invention, there is provided a mixing device comprising coaxially arranged, generally cylindrical inner and outer members, one of which is adapted to be rotated about the common axes relative to the other, the inner periphery of the outer member and the outer periphery of the inner member both having a plurality of sets of spaced teeth, each of which sets has its teeth disposed symmetrically about said common axis in a respective plane perpendicular to said axis, each set of teeth on one of the members being arranged to overlap radially the teeth of at least one adjacent set on the other member, a predetermined axial separation between adjacent sets of teeth on the two members being maintained by a pair of roller bearings disposed between the two members, each roller bearing including a plurality of radially extending rollers disposed between two raceways connected to said two members, respectively, the rollers defining a plurality of clearance passages therebetween, a chamber being located radially inwardly of one of said roller bearings and being connected to an inlet of the mixing device, and a chamber being located radially inwardly of the other of said roller bearings and being connected to an outlet of the mixing device, two further chambers being located radially outwardly of the two roller bearings, respectively, and being interconnected by an annular space containing the overlapping teeth, whereby, in use, material passing through the mixing device has to pass through said one of the roller bearing, through the space occupied by the relatively rotating, overlapping teeth and through the other roller bearing.

The invention is described further hereinafter, by way of example, with reference to the accompanying drawings, in which.

Figure 2:
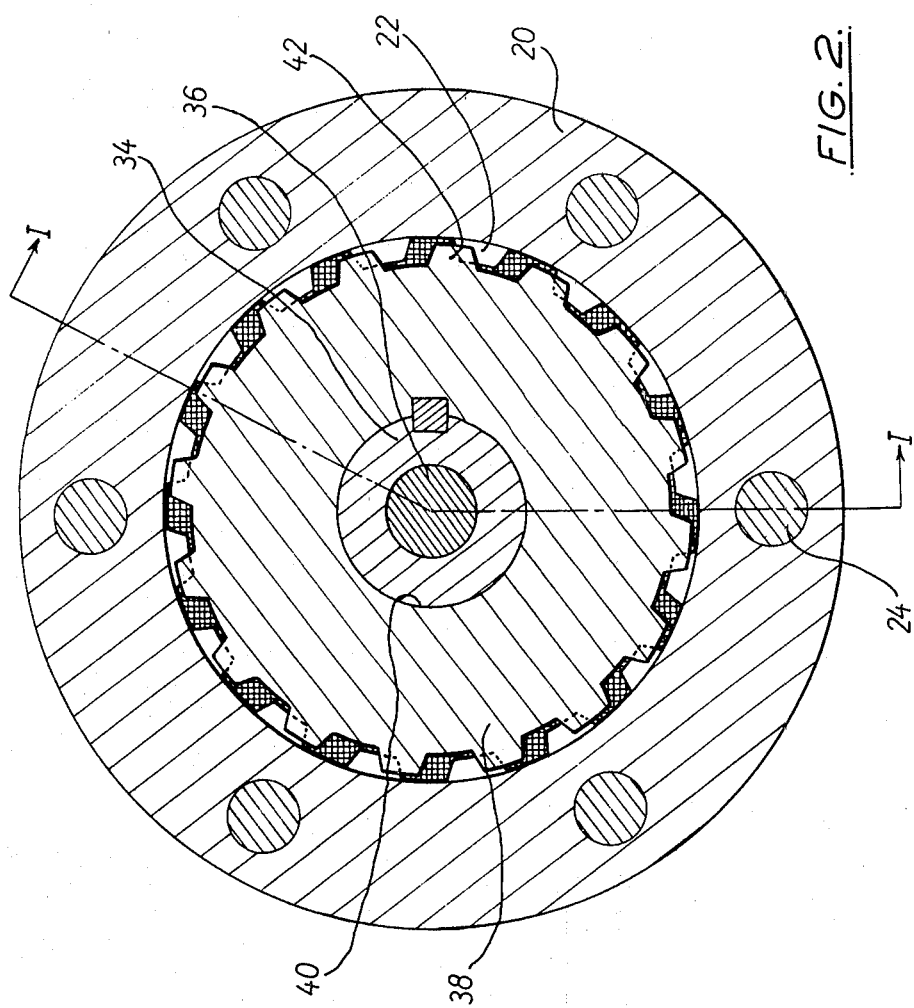
FIG. 2 is a transverse section on the line II—II of FIG. 1.

The illustrated mixing device has a generally cylindrical body 10 formed from a plurality of annular members which are clamped together by a number of bolts 12 and 14. The bolts 14 connect together first and second annular members 16,18 with a plurality (four in this instance) of annular plates 20 clamped therebetween. As described further below, the annular plates 20 each have castellated inner peripheries to provide a plurality of radially inwardly directed teeth 22 (see FIG. 2). As shown in FIG. 2, each plate 20 has a circular outer periphery and a plurality of holes 24 for receiving the clamping bolts 14. The bolts 12 serve to clamp annular end plates 26,28 to the first annular body member 16, the central apertures 30 of the plates 26,28 defining an inlet to the interior of the body member 10 for receiving materials to be mixed. The parts so far described form the stator of the mixing device.

Journalled within the body member is a rotor 32 which includes a pair of end members 34,36 which are rigidly connected together so as to clamp therebetween a plurality (four in this instance) of further annular discs 38. As seen from FIG. 2, each disc 38 has a central circular aperture 40 which engages over the end member 34 and a castellated outer periphery defining a plurality of radially outwardly directed teeth 42, equal in number and pitch to the teeth 22 on the plates 20. In the illustrated embodiment, there is also a spacer ring 44 between the left-hand disc 38 (as viewed in FIG. 1) and a shoulder 46 on the member 34, the right-hand disc 38 being engaged by a shoulder 48 on the member 36. By virtue of this arrangement, the members 34,36, the discs 38 and the spacer ring 44 rotate as a single unit. The latter unit is journalled within the body 10 by means of two bearings 50,52 which comprise pairs of flat frusto-conical raceways 54,56 and 58,60 and two sets of tapered rollers 62,64. The bearing 50 is located between the right-hand disc 38 and a radial wall 66 of the member 18 such that the raceway 54 remains stationary relative to the members 18 while the raceway 56 rotates with the discs 20, i.e. with the rotor. Similarly, the bearing 52 is located between the left-hand side of the spacer ring 44 and a radial surface 68 on the member 16 such that the raceway 58 remains stationary relative to the member 16 while the raceway 60 rotates with the discs 20, i.e. with the rotor.

Adjacent ones of the tapered rollers 62,64 are in longitudinal contact at their peripheries. Thus, a pair of clearance passages of roughly triangular cross-section is defined between each pair of adjacent rollers and the corresponding supporting raceways.

Figure 1:
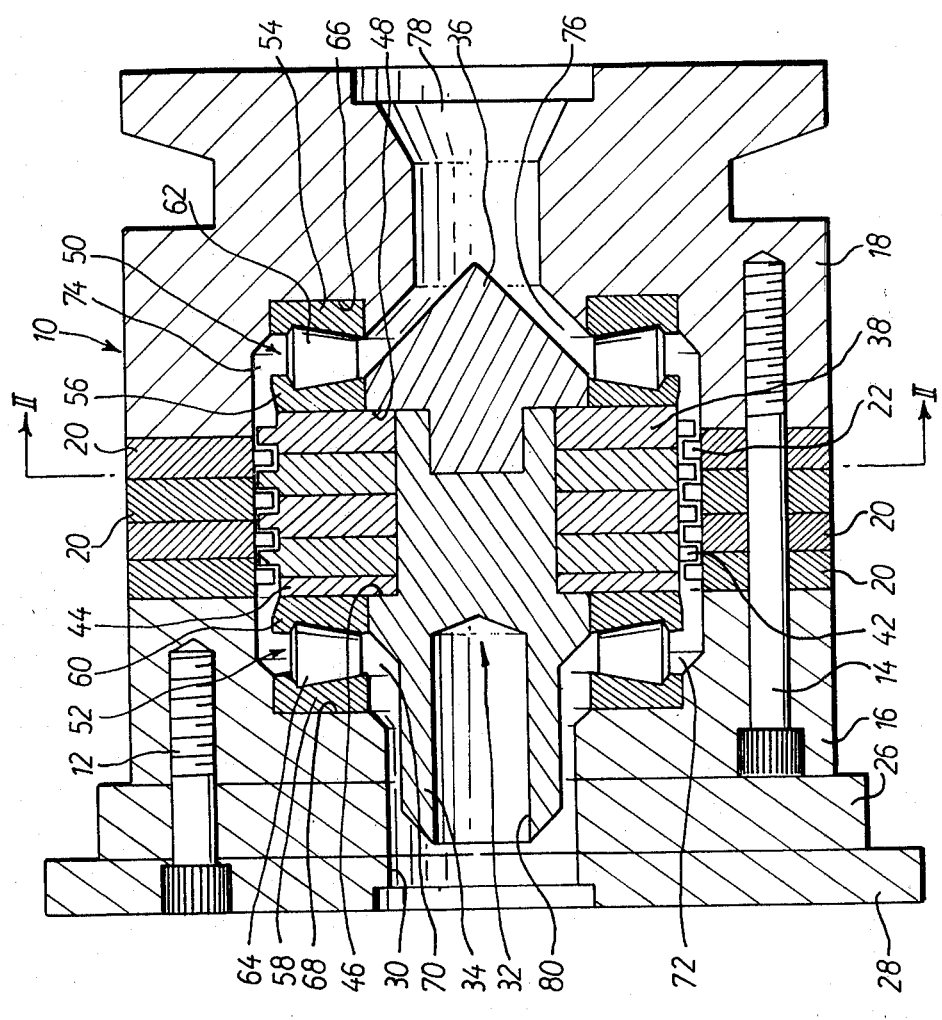
FIG. 1 is a longitudinal section through one embodiment of a mixing device in accordance with the present invention.

As shown in FIG. 1, the inlet aperture 30 communicates with an annular chamber 70 disposed immediately radially inwardly of the tapered rollers 64. Radially outwardly of the tapered rollers 64 there is a further annular chamber 72 which communicates with the space occupied by the teeth 22 and 42 on the rotor and stator. The teeth 22 and 42 are respectively disposed on the plates 20 and discs 38 such that each set of teeth on the discs 38 is freely received within the axial space between the sets of teeth on adjacent ones of the plates 20 whereby the rotor can rotate without mechanical engagement, or interference, between the teeth. The space occupied by the teeth also communicates with an annular chamber 74 located radially outwardly of the rollers 62. A further annular chamber 76 located radially inwardly of the rollers 62 communicates with an outlet aperture 78 of the device.

In use, the rotor is rotated by means of a shaft (not shown) attached to the left-hand end of the member 34. For example, the recess 80 in the member 34 may receive one end of a screw conveyor which transports materials to be mixed into the inlet 30 of the mixing device and thence into the annular chamber 70. From the chamber 70, the mixture passes substantially radially outwardly through the clearance passages between the rotating tapered rollers 64 and their raceways and into the chamber 72. During this passage through the rollers 64, the mixture is subjected to an intensive milling action. The mixture is then forced through the space occupied by the relatively rotating teeth 22,42 whereby it is subjected to an intensive shearing action which is repeated at each pair of relatively rotating radial surfaces which is encountered by the mixture. Upon reaching the annular chamber 74, the mixture then passes radially inwardly through the clearance passages between the tapered rollers 62 and their associated raceways where it is subjected to a further milling action before reaching the annular chamber 76 and being discharged through the outlet 78. The combination of the milling and shearing actions afforded by the mixing device results in a particularly thorough mixing of the component materials supplied to the input.

A particular advantage of the aforegoing structure is that the positive bearing arrangement for the rotor provided by the tapered rollers 62,64 results in very accurate axial positioning of the plates 20 and discs 38 and hence of the teeth 22,42 carried thereby, this positioning being maintained over long periods of operational use so that problems of teeth engagement and damage incurred with the known arrangements mentioned initially are obviated. The rollers 62,64 thus serve a dual purpose of providing a milling action to assist mixing and of positively and accurately maintaining the axial spacing of the teeth over long periods of use.

The actual shape, number and spacing of the teeth 22,42 is capable of wide variation and is not intended to be limited to the particular configuration illustrated. It is preferable, however, for the teeth 42 to be slightly smaller than the teeth 22 and to be capable of alignment as shown in FIG. 2 such that, for assembly and disassembly purposes, the stack of discs 38 can be displaced as a whole through the stack of plates 20 by the teeth 42 moving through the spaces between the teeth 22.

Figure 3:
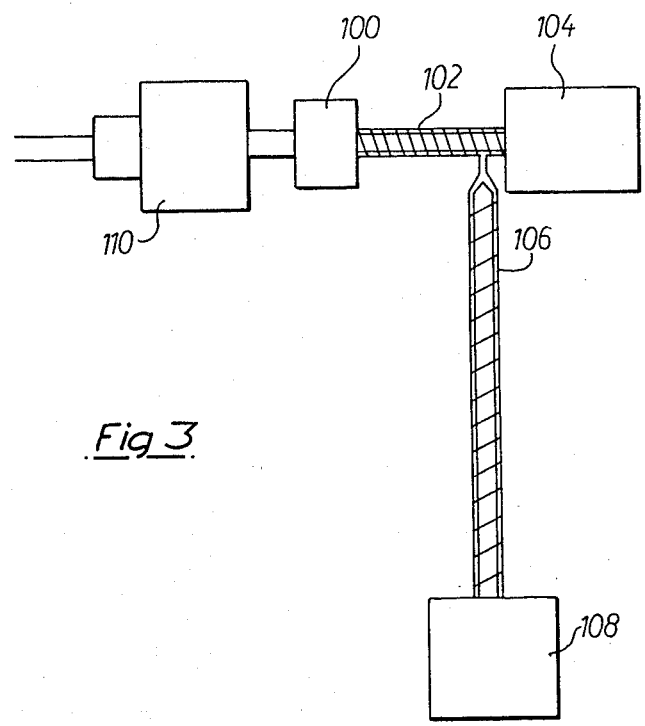
FIGS. 3 and 4 show the mixing device of FIGS. 1 and 2 incorporated in cascade and series supply lines, respectively.
Figure 4:
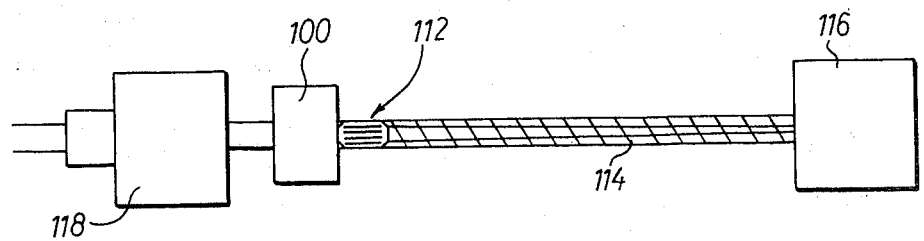

As illustrated diagrammatically in FIG. 3, the mixing device 100 can be connected in a cascade arrangement to a mixed feed screw 102, driven by a mixer drive unit 104, and to an extruder 106 driven by a separate extruder drive unit 108. The output of the mixing device is connected directly to a tube die 110. In another arrangement, the mixing device 100 can be connected directly to an extruder 114 (or via a Maddock element 112) driven by an extruder drive unit 116. Again the output of the mixing device is connected to a tube die 118.

The aforegoing mixing device has been found useful in the field of liquid additive mixing. The commercial application of liquid colouring has so far been confined almost entirely to injection moulding and its market penetration has been minimal. However, with similar advantages to solid masterbatches together with a generally lower material cost they may well be more widely used in the future. The usual system is to supply the liquid colour from a metering pump through a flexible tube to the feed throat of the injection moulding machine. Two factors which have retarded the more widespread usage are that (1) colour changing is messy and (2) the levels of addition are critical, i.e. if normal levels of addition are exceeded, then granule conveying failure occurs in the feed zone while reduced levels can produce a streaky product.

In experiments using the present mixer, a range of liquid colours was used for the extrusion of blown film and a range of uniformly coloured films was produced, including lightly tinted material. Coloured foamed film was made by injecting a combined colour and blowing agent dispersion. It has been discovered from these experiments that a particular advantage of the use of the present mixer is the comparatively rapid change-over achieved from one colour to another. Colour change-over can therefore be made quite rapidly by simply operating a colour selector valve as directly injecting from a battery of pumps, at a point upstream of the mixer in either case. This avoids the messy process of changing pipes and cleaning pumps which exists at present.

In addition to liquid colours and blowing agents, cross-linking agents can be similarly added.

I claim:

1. A mixing device comprising:
   a generally cylindrical inner member;
   a generally cylindrical outer member;
   means coaxially mounting said inner and outer members;
   means enabling one of said inner and outer members to be rotated relative to the other about a common axis;
   a plurality of first sets of spaced teeth carried by the inner periphery of the outer member;
   a plurality of second sets of spaced teeth carried by the outer periphery of the inner member;
   each of said sets of teeth having its teeth disposed symmetrically about said common axis in a respective plane perpendicular to said axis;
   each set of teeth on one of said members overlapping radially the teeth of at least one adjacent set on the other of said members;
   a pair of roller bearings disposed between said two members, said roller bearings maintaining a predetermined axial separation between adjacent sets of teeth on the two members;
   each roller bearing including a plurality of radially extending tapered rollers disposed between two raceways connected to said two members, respectively, the rollers defining a plurality of clearance passages therebetween;
   means defining a first chamber located radially inwardly of one of said roller bearings and connected to an inlet of the mixing device;
   means defining a second chamber located radially inwardly of the other of said roller bearings and connected to an outlet of the mixing device;
   two further chambers located radially outwardly of said two roller bearings, respectively; and
   means defining an annular space containing the overlapping teeth and interconnecting said two further chambers, whereby, in use, material passing through the mixing device has to pass through said one of the roller bearing, through the space occupied by the relatively rotating, overlapping teeth and through the other roller bearing.

2. A mixing device according to claim 1 including means for mounting the inner member for rotation relative to the outer member about said common axis and in which said sets of stationary teeth and sets of moving teeth are carried respectively by the inner periphery of the outer member and the outer periphery of the inner member, with each set of teeth disposed symmetrically about said common axis in a respective plane perpendicular to said axis and with the teeth in each set on one of the members overlapping radially the teeth of at least one adjacent set on the other member.

3. A mixing device according to claim 2, in which the rollers extend radially relative to said common axis and in which one of the raceways of each pair is connected to one of said inner and outer members and the other of the raceways of each pair is connected to the other of said members.

4. A mixing device according to claim 1, including a conveying device for conveying materials to be mixed to said first plurality of rollers and a plurality of individually controllable liquid supply devices for selectively supplying liquid colour to said conveying device.

* * * * *